(No Model.)
M. BERDAN.
WIRE FENCE.
No. 521,328. Patented June 12, 1894.
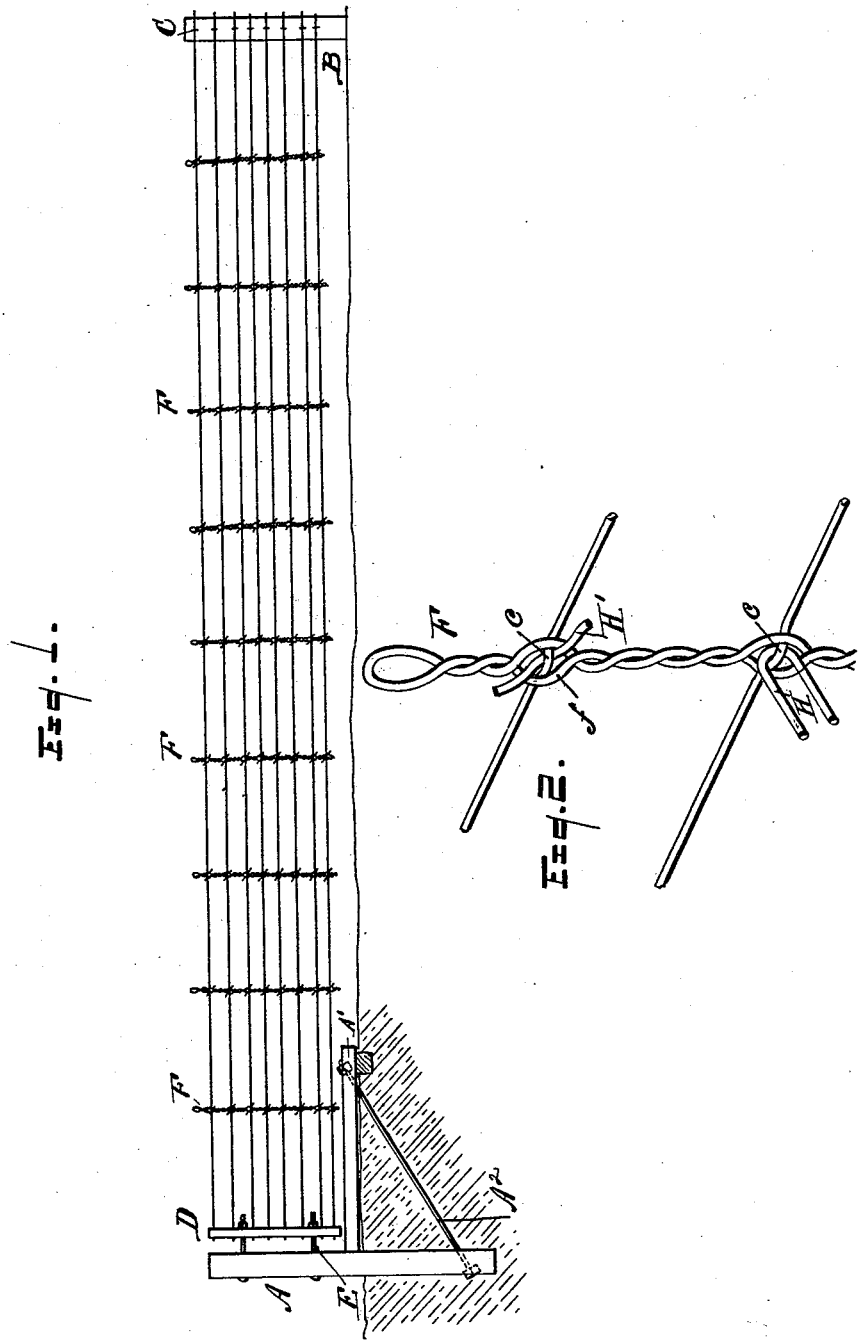
WITNESSES
J. E. Thomas
L. B. French
INVENTOR
Marvin Berdan
By Charles H. Fisk
Attorney

UNITED STATES PATENT OFFICE.

MARVIN BERDAN, OF PLYMOUTH, MICHIGAN.

WIRE FENCE.

SPECIFICATION forming part of Letters Patent No. 521,328, dated June 12, 1894.

Application filed February 19, 1894. Serial No. 500,756. (No model.)

*To all whom it may concern:*

Be it known that I, MARVIN BERDAN, a citizen of the United States, residing at Plymouth, county of Wayne, State of Michigan, have invented a certain new and useful Improvement in Wire Fences; and I declare the following to be a full, clear, and exact description of the invention, such as will enable others skilled in the art to which it pertains to make and use the same, reference being had to the accompanying drawings, which form a part of this specification.

My invention relates to improvements in wire fences, and consists in improved means for uniting the line and stay wires.

My invention is shown in the accompanying drawings, in which—

Figure 1 is an elevation showing one length of fence. Fig. 2 is an enlarged view showing the manner of uniting the line and stay wire.

In the drawings, A is an end or stay post, and is anchored by means of the horizontal ground piece A', and the diagonal stay rod $A^2$.

B is a line post on which the line wires C, C are supported in the staples $b$. D is a tightening head block to which one end of the series of line wires is attached.

E, E are tightening bolts by means of which the line wires are put under tension. The opposite ends of the line wires are attached and tightened in the same manner, as herein shown, so that the tension can be put on from either or both ends.

F, F are stay wires, or wire slats, made of a looped wire twisted. They are provided with openings $f, f$ at distances to correspond with the space between the line wires. These openings are made by inserting in the looped wire to be twisted, wedges at such a distance as will leave the opening properly spaced when the stay wire is twisted. Heretofore, in forming twisted stay wires, the wires have been twisted between pins. I find that a stay wire so formed cannot be stapled to the line wire, as it is necessary to make the staple tight, that one end should turn to one side of the stay wire and the other end to the opposite side, as shown in Fig. 2. The position of the wires, shown in the drawings, prevents the staple from rolling while being spread. After the line wires are stretched each wire is kinked, as shown at $c, c$. These kinks are in a vertical line, and correspond with and fit the openings $f, f$ in the stay wires F, F. To unite the line and stay wires, the kink $c$ is laid into the corresponding opening $f$, as shown, and the staple H passed through the opening over the line wire. The staple is then opened out and pressed into the form shown at H'. The staple when opened out forms a key that holds the two wires firmly together. I employ a suitable machine for opening out the staple H.

Where a single wire slat is used, I employ a washer to which the line and stay wires are held by staples, but the form shown is preferable.

The advantage of my construction comes from the fact that I use a wire key cut from the wire used in the other parts of the fence.

What I claim is—

In a wire fence, the combination of a line wire, stay wires twisted from end to end, said stay wires provided with openings one to each line wire, and the staples locked diagonally across the line and stay wires, substantially as described.

In testimony whereof I sign this specification in the presence of two witnesses.

MARVIN BERDAN.

Witnesses:
R. C. SAFFORD,
FANNIE BAIRD.